US009135107B2

(12) United States Patent
Shigeeda

(10) Patent No.: US 9,135,107 B2
(45) Date of Patent: Sep. 15, 2015

(54) MEMORY CONTROL DEVICE AND MEMORY CONTROL METHOD

(75) Inventor: Tetsuya Shigeeda, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 180 days.

(21) Appl. No.: 13/820,681

(22) PCT Filed: Sep. 6, 2010

(86) PCT No.: PCT/JP2010/065255
§ 371 (c)(1),
(2), (4) Date: Mar. 4, 2013

(87) PCT Pub. No.: WO2012/032595
PCT Pub. Date: Mar. 15, 2012

(65) Prior Publication Data
US 2013/0173992 A1 Jul. 4, 2013

(51) Int. Cl.
*G11C 29/00* (2006.01)
*G06F 11/10* (2006.01)
*G06F 11/14* (2006.01)

(52) U.S. Cl.
CPC ............ *G06F 11/10* (2013.01); *G06F 11/1008* (2013.01); *G06F 11/1417* (2013.01)

(58) Field of Classification Search
CPC .. G06F 11/10; G06F 11/1008; G06F 11/1417
USPC .................................. 714/752, 755, 758, 764
See application file for complete search history.

(56) References Cited

U.S. PATENT DOCUMENTS

2006/0117239 A1* 6/2006 Lin et al. ..................... 714/758
2010/0169556 A1   7/2010 Nakanishi et al.
2010/0281340 A1  11/2010 Franceschini et al.

FOREIGN PATENT DOCUMENTS

JP  2006-331233 A1  12/2006
JP  2010-146226 A    7/2010

(Continued)

OTHER PUBLICATIONS

International Search Report (PCT/ISA/210) issued on Apr. 19, 2011, by the Japanese Patent Office as the International Searching Authority for International Application No. PCT/JP2010/065255.

(Continued)

*Primary Examiner* — Sam Rizk
(74) *Attorney, Agent, or Firm* — Buchanan Ingersoll & Rooney PC

(57) ABSTRACT

A memory control device includes a CPU, a flash ROM that records therein first information having undergone an error-correction coding process and second information not having undergone an error-correction coding process, an address line switch that switches between a first path that connects an address bus to the ROM so that the CPU can read the first information and a second path that connects the address bus to the ROM so that the second information can be erased, written, and read, a decoder that performs error correction on the first information and performs decoding, and a second switch that switches between a third path that connects the decoder to the data bus so that information decoded by the decoder is transmitted to the data bus and a fourth path that connects the ROM to the data bus so that the second information can be erased, written, and read.

7 Claims, 3 Drawing Sheets

(56) References Cited

FOREIGN PATENT DOCUMENTS

| | | |
|---|---|---|
| JP | 2010-152703 A | 7/2010 |
| JP | 2010-262640 A | 11/2010 |
| WO | WO 2009/125470 A1 | 10/2009 |

OTHER PUBLICATIONS

Written Opinion (PCT/ISA/237) issued on Apr. 19, 2011, by the Japanese Patent Office as the International Searching Authority for International Application No. PCT/JP2010/065255.

Extended European Search Report dated Apr. 17, 2014, issued by the European Patent Office in corresponding European Application No. 10856945.0. (7 pages).

Office Action from the Chinese Patent Office dated Nov. 25, 2014, issued in corresponding Chinese Patent Application No. 201080068952.7, with English translation of the Office Action. (16 pages).

\* cited by examiner

MEMORY CONTROL DEVICE AND MEMORY CONTROL METHOD

FIELD

The present invention relates to a memory control device and a memory control method that use an electrically-rewritable non-volatile memory (a "flash ROM" or an "EEPROM: Electrically Erasable Programmable ROM").

BACKGROUND

In recent years, generally, a memory control device that executes various control by a CPU (Central Processing Unit) has incorporated therein a flash ROM as a recording medium, such as an operating system (OS) and application software. This flash ROM has the following characteristics. (1) Even when its power is switched off, data is maintained. (2) Before data is written, erasing of a write area needs to be performed. (3) Data needs to be erased by a unit of block defined for each device, and the erasing of data is performed by applying signals to data pins of each device by a predetermined procedure. (4) Data writing is performed by applying signals to data pins of a device by a predetermined procedure.

Because the flash ROM is configured to record therein a data value by confining charges, a phenomenon referred to as "charge leakage" occasionally occurs because of a variation between data retention times of memory cells, influence of noise, and the like. A bit error occurs in data stored in the flash ROM with a certain probability by the charge leakage.

To solve such problems, in a conventional technique represented by Patent Literature 1 mentioned below, there is disclosed a recording device including the flash ROM described above as a recording medium and an error correction technique for correcting data to normal data when an error in a data value occurs in the flash ROM.

CITATION LIST

Patent Literature

Patent Literature 1: Japanese Patent Application Laid-open No. 2006-331233

SUMMARY

Technical Problem

According to the conventional technique represented by Patent Literature 1 mentioned above, both a flash ROM that can perform, for example, erasing, writing, and reading (hereinafter, simply "writing and the like") and a read only ROM are used at the same time, and the conventional technique has a mode in which, with regard to accessing a data bus at the time of starting a CPU, the CPU operates an address signal and a memory control signal in order to read data related to a starting program (also referred to as "initialization program") stored in the ROM. In this mode, when the data related to the starting program and data other than the starting program are stored in the flash ROM, and the CPU is started stably and then writing and the like of the data other than the starting program is performed by using these pieces of data, a bus operation that enables error correction of the data related to the starting program and another bus operation that enables writing and the like need to be considered. However, these bus operations are not considered in the conventional technique represented by Patent Literature 1 mentioned above, and thus it is difficult to start a CPU stably and to perform writing and the like of data by using a flash ROM.

The present invention has been achieved in view of the above problems, and an object of the present invention is to provide a memory control device and a memory control method that can start a CPU stably and perform writing and the like of data by using a flash ROM.

Solution to Problem

In order to solve the above problem and in order to attain the above object, a memory control device of the present invention, includes: a CPU; an electrically-rewritable non-volatile memory that records therein first information having undergone an error-correction coding process and second information not having undergone an error-correction coding process; a first switch that detects an address output from the CPU, and switches between a first path that connects an address bus to the memory so that the CPU can read first information recorded in the memory and a second path that connects the address bus to the memory so that the second information recorded in the memory can be erased, written, and read; a decoder that performs error correction on the first information recorded in the memory, removes a redundant bit from corrected information, and decodes information before undergoing an error-correction coding process; and a second switch that detects an address output from the CPU, and switches between a third path that connects the decoder to a data bus so that information decoded by the decoder is transmitted to the data bus of the CPU and a fourth path that connects the memory to the data bus so that the second information recorded in the memory can be erased, written, and read.

Advantageous Effects of Invention

According to the present invention, because a first switch and a second switch are provided, it is possible to start a CPU stably and to perform writing and the like of data by using a flash ROM.

DESCRIPTION OF EMBODIMENTS

Exemplary embodiments of a memory control device and a memory control method according to the present invention will be explained below in detail with reference to the accompanying drawings. The present invention is not limited to the embodiments.

First Embodiment

Figure 1:
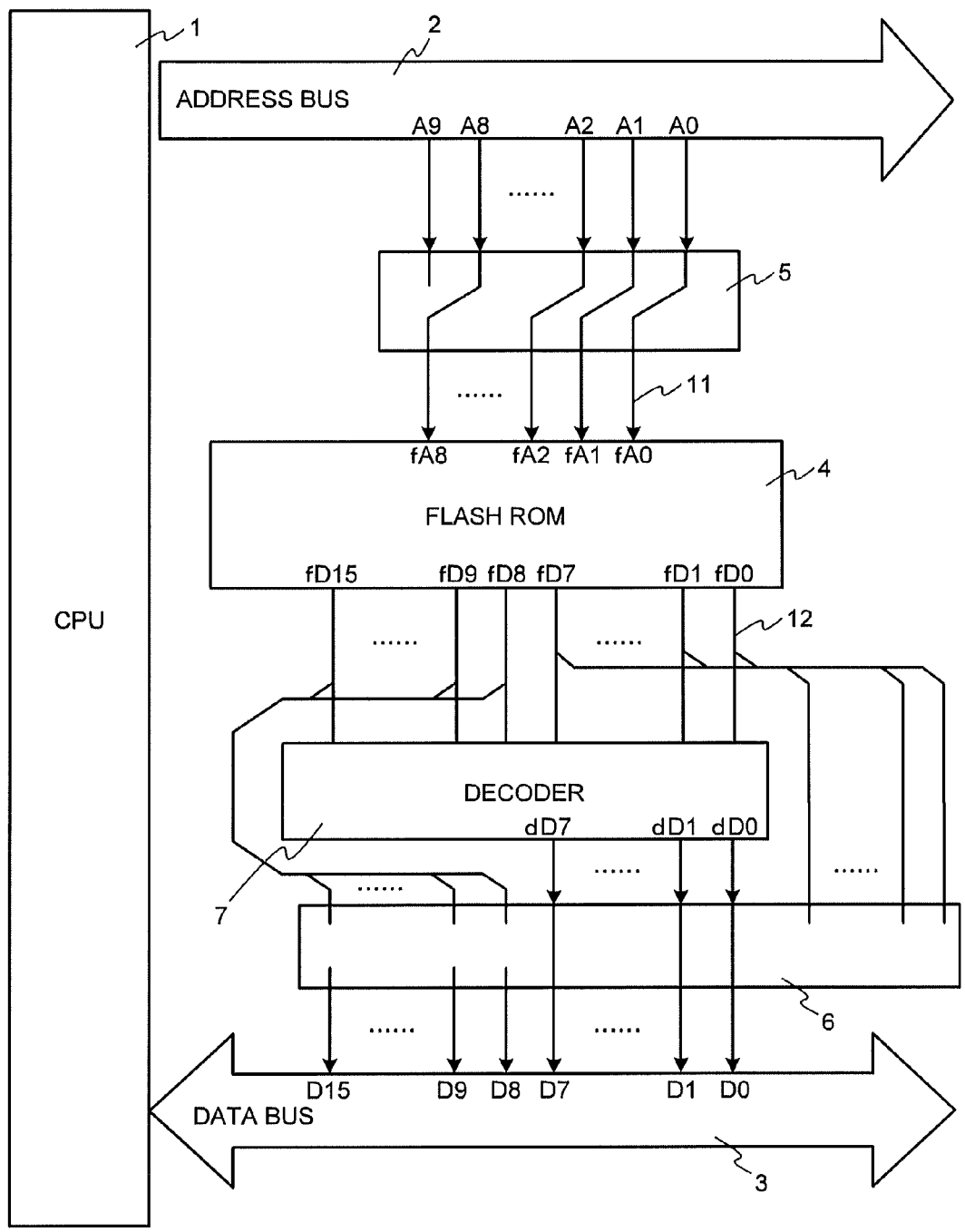
FIG. 1 is a configuration diagram of a memory control device according an embodiment of the present invention, and is an explanatory diagram of an operation at the time of starting a CPU.
Figure 2:
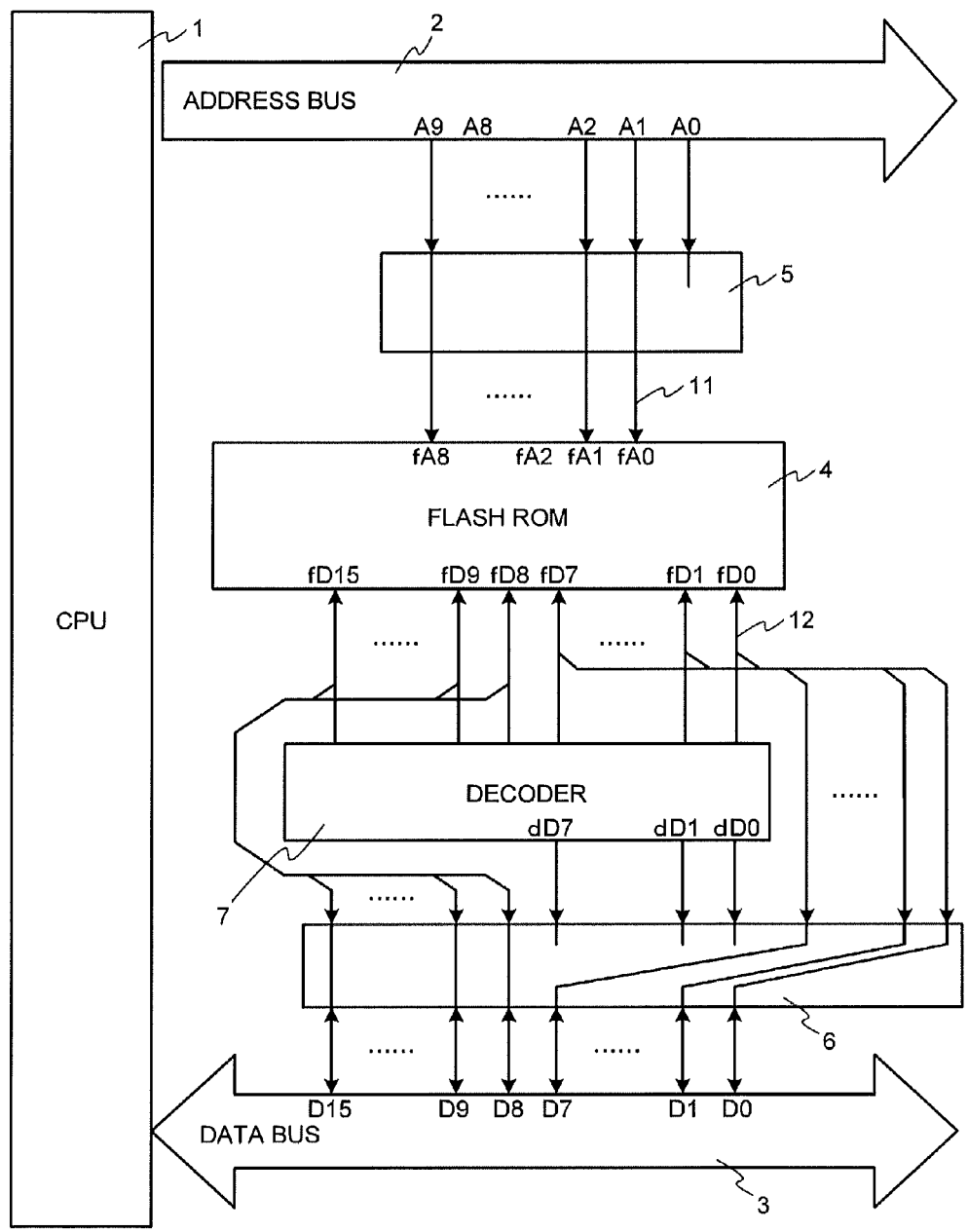
FIG. 2 is a configuration diagram of the memory control device according to the embodiment of the present invention, and is an explanatory diagram of an operation at the time of a writing operation or an erasing operation of a flash ROM.

FIG. 1 is a configuration diagram of a memory control device according an embodiment of the present invention, and is an explanatory diagram of an operation at the time of starting a CPU 1. FIG. 2 is a configuration diagram of the memory control device according to the embodiment of the present invention, and is an explanatory diagram of an operation at the time of a writing operation or an erasing operation of a flash ROM 4.

In the following descriptions, as the order of explanation, a configuration of the memory control device is explained first, and then an operation at the time of starting the CPU 1 and an operation at the time of writing and the like of data in the flash ROM 4 are explained.

With reference to FIGS. 1 and 2, the memory control device according to the present embodiment is configured to include the CPU 1, the flash ROM 4 (hereinafter, simply "ROM 4"), an address line switch 5 (first switch) interposed between an address bus 2 of the CPU 1 and the ROM 4, a decoder 7, and a data line switch 6 (second switch), as main constituent elements.

The CPU 1 controls operations of the memory control device. The CPU 1 has a function of switching a data bus width to, for example, an 8-bit data bus width or a 16-bit data bus width and operates a bus control line (not shown) to access devices connected to the address bus 2 or a data bus 3. Examples of the devices include the address line switch 5 and the data line switch 6.

Switching of the data bus width is performed based on a chip select signal (CS) generated in a bus controller (not shown) incorporated in the CPU 1. For example, the CPU 1 accesses the ROM 4 at the 8-bit data bus width when CS=0 and at the 16-bit data bus width when CS=1.

In the address bus 2, an LSB (least significant bit) is A0 and an MSB (most significant bit) is An (n=1, 2, . . . ). In FIGS. 1 and 2, the address bus 2 of A0 to A9 is shown as an example. In the data bus 3, the LSB is D0 and the MSB is Dn (n=1, 2, . . . ). In FIGS. 1 and 2, the data bus 3 of D0 to D15 is shown as an example. The address bus width and data bus width shown in FIGS. 1 and 2 are shown for convenience of explanation, and the present invention is not limited thereto.

The ROM 4 is explained next. The ROM 4 is a type of an electrically-rewritable EEPROM and is a non-volatile memory that retains information even though any drive power is not supplied. The present embodiment is explained on an assumption that the ROM 4 has a data bus with of, for example, 16 bits (2 bytes).

In the ROM 4, various pieces of data such as data related to a starting program and data related to an application program are recorded. In the present embodiment, it is assumed that, for example, data having undergone an error-correction coding process (hereinafter, "first information") and data not having undergone an error-correction coding process (hereinafter "second information") are recorded in the ROM 4.

The data before undergoing an error-correction coding process is, for example, data handled when the CPU 1 accesses the ROM 4 at CS=0. It suffices that this data is data that is supposed to require error correction in the decoder 7, and this data is, for example, data related to a starting program of the CPU 1. This data is then coded by a hamming code with a code length of 15 and the number of information bits of 11, and then recorded in the ROM 4 as the first information. The second information is, for example, data to be written and the like.

As it is well known, the hamming code is constituted by a code length $n=2^{m-1}$ (m is an integer) and an information number $k=n-m$. The information number is the number of bits of the original data and the code length is the number of bits of a generated code. For example, when m=4, n=15 and k=11, and a hamming code that substitutes an 11-bit bit string by a 15-bit code word is generated.

An address signal of the ROM 4 is such that the LSB is fA0 and the MSB is fAn (n=1, 2, . . . ). In FIGS. 1 and 2, an address signal of fA0 to fA8 is shown as an example. A data signal of the ROM 4 is such that the LSB is fD0 and the MSB is fDn (n=1, 2, . . . ). In FIGS. 1 and 2, a data signal of fD0 to fD15 is shown as an example.

According to the example shown in FIGS. 1 and 2, the ROM 4 outputs a 16-bit signal corresponding to address values of fA0 to fA8. An output from the ROM 4 is loaded into the decoder 7 and the data line switch 6.

The decoder 7 is explained next. The decoder 7 performs error correction on the first information explained above to decode the data before undergoing an error-correction coding process. When the first information recorded in the ROM 4 is 15-bit data coded by the hamming code described above, the decoder 7 loads the first information from fD0 to fD15 of a data bus of the ROM 4, decodes 11-bit information, and outputs data of 8 bits among 11 bits from dD0 to dD7. That is, the decoder 7 performs error correction on the first information recorded in the ROM 4, removes a redundant bit from the corrected information, and decodes the information before undergoing an error-correction coding process. Data output from the decoder 7 is loaded via the data line switch 6 into D0 to D7 (8 bits) of the data bus 3.

An operation of the decoder 7 is explained by using the code length n and the information number k mentioned above. The decoder 7 decodes 11-bit information "k" from a 15-bit signal "n" output from the ROM 4 and outputs 8 bits of 11 bits to the data bus 3. This 8-bit data is data having its error corrected.

The address line switch 5 is explained next. One end of the address line switch 5 is connected to A0 to An (n=1, 2, . . . ) of an address bus and the other end thereof is connected to the ROM 4. The address line switch 5 is interposed between the address bus 2 and the ROM 4 and switches correspondences between A0 to An of the address bus and addresses fA0 to fAn of the ROM 4. In other words, the address line switch 5 switches between a first path connecting the address bus 2 of the CPU 1 to the ROM 4 so that the CPU 1 can read the first information from the ROM 4 and a second path connecting the address bus 2 to the ROM 4 so that the CPU 1 can write the second information.

As shown in FIG. 1, the first path is, for example, a path connecting A0 to A8 of the address bus 2 to the address signals fA0 to fA8 of the ROM 4. As shown in FIG. 2, the second path is, for example, a path connecting A1 to A9 of the address bus 2 to the address signals fA0 to fA8 of the ROM 4.

The data line switch 6 is explained next. One end of the data line switch 6 is connected to outputs dD0 to dDn of the decoder 7 and outputs fD0 to fDn of the ROM 4. The other end thereof is connected to the data bus 3. The data line switch 6 is interposed between the decoder 7 and the data bus 3 and switches between the outputs dD0 to dDn of the decoder 7 and the outputs fD0 to fDn from the ROM 4. In other words, the data line switch 6 switches between a third path connecting the decoder 7 to the data bus 3 so that the first information having undergone error correction in the decoder 7 is transmitted to the data bus 3 of the CPU 1 and a fourth path connecting the ROM 4 to the data bus 3 so that the second information recorded in the CPU 1 can be written and the like.

As shown in FIG. 1, for example, the third path is a path connecting the outputs dD0 to dD7 of the decoder 7 to D0 to D7 of the data bus 3. As shown in FIG. 2, for example, the fourth path is a path connecting the outputs fD0 to fD15 of the ROM 4 to D0 to D15 of the data bus 3.

As explained above, the memory control device according to the present embodiment is configured to determine the address value at the time of the operation of the CPU 1 for specifying an operation of the address line switch 5 and an operation of the data line switch 6.

In the following descriptions, the operation of the address line switch 5 and the operation of the data line switch 6 are explained in detail. As the flow of explanation, an operation at the time of reading the first information from the ROM 4 is explained first, and then an operation at the time of writing and the like of data in the ROM 4 is explained. The former operation is, as an example, an operation when the CPU 1 operates at the 8-bit data bus width and accesses the ROM 4 at an address at the time of starting (a starting address). The latter operation is, as an example, an operation when the CPU 1 operates at the 16-bit data bus width and accesses the ROM 4 at an address at the time of performing writing and the like.

The operation of reading the first information from the ROM 4 is explained first with reference to FIG. 1. As an example, the following explanation is made with respect to a case of starting the CPU 1, and it is assumed that the first information is data related to the starting program, for example.

When the CPU 1 is started, the CPU 1 operates at the 8-bit data bus width. The CPU 1 then outputs a starting address specific to a device (the CPU 1) and accesses the ROM 4.

The address line switch 5 and the data line switch 6 are configured to monitor an address signal of the address bus 2 and to perform a switching operation corresponding to this address. To explain specifically, when the CPU 1 accesses the ROM 4 at an address value at the time of starting, the address line switch 5 detects this address value, associates the address bus 2 with an address line of the ROM 4 as follows, and connects them to each other.

A0-fA0
A1-fA1
An-fAn (n=0, 1, 2, ... 9)

The above operation is specifically explained. When the LSB of the address at the time of starting (for example, a four-digit address XXXX) changes from XXX0 to XXX1 or from XXX1 to XXX0, that is, each time the address value is incremented by 1, the ROM 4 needs to advance by one word (16 bits). To achieve this, it suffices to configure that the address line switch 5 detects the address value at the time of starting and connects the LSB (A0) of the address bus to the LSB (fA0) of the ROM 4. As a result, each time A0 of the address bus 2 changes, the ROM 4 advances by one word.

Meanwhile, when the CPU 1 accesses the ROM 4 at the address value at the time of starting, the data line switch 6 detects this address value, associates the data bus 3 with an output of the decoder 7 as follows, and connects them to each other.

D0-dD0
D1-dD1
Dn-dDn (n=0, 1, 2, ..., 7)

As the data line switch 6 operates in this way, 16-bit data (fD0 to fD15) is output from the ROM 4.

The decoder 7 loads 15 bits (fD0 to fD14) among 16 bits, decodes 11-bit information, and outputs 8 bits among these 11 bits to D0 to D7 (8 bits) of the data bus 3. As explained above, an error-correction coding process is performed on the data corresponding to the address at the time of starting (the data related to the starting program) and recorded in the ROM 4 as the first information. That is, 8-bit data (the data related to the starting program) is recorded in the ROM 4 as 15-bit data (the first information).

The memory control device according to the present embodiment is configured to, when the CPU 1 operates at the 8-bit data bus width and accesses the ROM 4 at the address at the time of starting, switch the paths of the address line switch 5 and the data line switch 6 as shown in FIG. 1, so that the first information can be read and data having its error corrected can be transmitted to the data bus 3. Accordingly, even when an error in a data value occurs in the ROM 4, the CPU 1 can be normally started.

Next, the operation at the time of writing and the like of data in the ROM 4 is explained with reference to FIG. 2. It is assumed that it is designed so that when the CPU 1 accesses the ROM 4, the address at the time of starting does not overlap the address at the time of writing and the like.

When writing and the like of the ROM 4 is performed, the CPU 1 operates at the 16-bit data bus width. The CPU 1 then outputs an address value at the time of writing and the like and accesses the ROM 4.

When the CPU 1 accesses the ROM 4 at the address value at the time of writing and the like, the address line switch 5 detects this address value, associates the address bus 2 with an address line of the ROM 4 as follows, and connects them to each other.

A1-fA0
A2-fA1
An-fA(n−1) (n=0, 1, 2, ..., 9)

The above operation is specifically explained. When a second-digit bit of the address at the time of writing and the like (for example, a four-digit address XXXX) from the bottom changes from XX0X to XX1X or from XX1X to XX0X, that is, each time the address value is incremented by 2, the ROM 4 needs to advance by one word (16 bits). To achieve this, it suffices to configure that the address line switch 5 detects the address value at the time of writing and the like and connects A1 of the address bus to fA0 of the ROM 4. As a result, each time A1 of the address bus 2 changes, the ROM 4 advances by one word.

Meanwhile, when the CPU 1 accesses the ROM 4 at the address value at the time of writing and the like, the data line switch 6 detects this address value, associates the data bus 3 with an output of the ROM 4 as follows, and connects them to each other.

D0-fD0
D1-fD1
Dn-fDn (n=0, 1, 2, ..., 15)

As the data line switch 6 operates in this way, fD0 to fD15 of the ROM 4 are connected to D0 to D15 of the data bus 3. As the CPU 1 operates at the 16-bit data bus width, for example, the first information coded by the CPU 1 can be written in the ROM 4.

The CPU 1 according to the present embodiment accesses the ROM 4 at the address at the time of writing and the like by an access system that is identical to that of a normal NOR-type flash ROM. That is, while the CPU 1 operates the address bus 2 and a bus control signal (not shown) to access a device (the ROM 4) via the data bus 3, the CPU 1 can access the ROM 4, as the ROM 4 itself being a bus-connected device. Therefore, the CPU 1 can perform a writing operation and an erasing operation prepared in the ROM 4 via the data bus 3.

The writing operation is an operation in which the CPU 1 writes a write command in the ROM 4 for writing data and reads completion of writing from the ROM 4. The erasing operation is an operation in which the CPU 1 writes an erase command in the ROM 4 for erasing data and reads completion of erasing from the ROM 4.

These operations can be performed by the CPU 1 accessing the ROM 4 at the 16-bit data bus width. Furthermore, to access the ROM 4 at the 16-bit data bus width, the address line switch 5 and the data line switch 6 need to perform a switch operation. Because the address line switch 5 and the data line switch 6 according to the present embodiment are configured to monitor the address signal of the address bus 2 and to perform an operation according to this address, when the address at the time of writing and the like is detected, the switch operation shown in FIG. 2 is performed, so that the writing operation or the erasing operation is realized.

In the above description, it has been explained on an assumption that hamming coding of starting data written in the ROM 4 is performed by coding calculation in the CPU 1; however, the present invention is not limited thereto. For example, it is also possible to configure that dedicated hardware is incorporated in the memory control device for performing hamming coding. When it is configured in this way, software can be simplified.

It is also possible to employ a mode in which hamming coding of data is performed in an information processing system other than the memory control device and the coded data is written in the ROM 4. In this manner, the load of the CPU 1 can be reduced.

While an example of using a hamming code has been described as a method of the error-correction coding process, the present invention is not limited to a hamming code and error-correction codes other than a hamming code can be also applied.

Data before undergoing an error-correction coding process is not limited to data related to a starting program, and as long as it is data that is supposed to require error correction in the decoder 7, any type of data can be used.

Furthermore, in the above description, it has been explained on an assumption that, as an example, the CPU 1 accesses the ROM 4 at the 8-bit data bus width at the time of reading the first information and at the 16-bit data bus width at the time of writing and the like the second information, the data bus width is not limited to these widths.

A mode of transmitting data with the first information having undergone error correction in the decoder 7 to the data bus 3 has been explained in the above description. In this mode, as it is well known, when a hamming code is used, it is possible to perform error correction of 1 bit. Accordingly, when an error of 2 or more bits occurs, it may become impossible to perform error correction. To solve such a problem, the memory control device according to the present embodiment can be configured as follows.

For example, a predetermined register is prepared in the decoder 7, and when the decoder 7 performs error correction, error occurrence information is stored in the register and the CPU 1 detects this error occurrence information via the register. Furthermore, the CPU 1 identifies a storage area where an error in the ROM 4 has occurred, reads data of this storage area, performs hamming-coding on this data, and then writes this data in the corresponding part (the storage area where an error has occurred). In this manner, the decoder 7 is configured to retain a result of error detection at the time of decoding as decoder internal information.

By the above operation, for example, even when an error of 1 bit occurs in the ROM 4, data is written in the ROM 4 in an error-correctable state. That is, according to the memory control device of the present embodiment, data is returned to an error correctable state before a large number of bit errors occur, thereby suppressing occurrence of uncorrectable errors.

As explained above, the memory control device according to the present embodiment includes the CPU 1, the ROM 4 (memory) that records therein the first information having undergone an error-correction coding process and the second information not having undergone an error-correction coding process, the address line switch 5 (first switch) that detects an address output from the CPU 1, and switches between the first path that connects the address bus 2 to the ROM 4 so that the CPU 1 can read the first information recorded in the ROM 4 and the second path that connects the address bus 2 to the ROM 4 so that the second information recorded in the ROM 4 can be erased, written, and read, the decoder 7 that performs error correction on the first information recorded in the ROM 4, removes a redundant bit from the corrected information, and decodes the information before undergoing an error-correction coding process, and the data line switch 6 (second switch) that detects an address output from the CPU 1 and switches between the third path that connects the decoder 7 to the data bus 3 so that information decoded by the decoder 7 is transmitted to the data bus 3 of the CPU 1 and the fourth path that connects the ROM 4 to the data bus 3 so that the second information recorded in the ROM 4 can be erased, written, and read. Accordingly, when a first address indicating that the first information is to be read (for example, a starting address) is output from the CPU 1, the address line switch 5 connects the address bus 2 to the ROM 4 by the first path and the data line switch 6 connects the decoder 7 to the data bus 3 by the third path, so that error-corrected data can be read. Furthermore, when a second address indicating that the second information is to be written and the like is output from the CPU 1, the address line switch 5 connects the address bus 2 to the ROM 4 by the second path and the data line switch 6 connects the decoder 7 to the data bus 3 by the fourth path, so that the erasing operation and the writing operation can be performed on data in the ROM 4.

In a conventional memory control device, when its power is switched on, a CPU reads a starting program stored in a ROM. Furthermore, based on the starting program, the conventional memory control device reads an OS loader from a storage device in which writing and the like of data can be performed (for example, a hard disk or a flash ROM) and executes the OS loader. In this manner, the conventional memory control device has a mode in which both a ROM that stores therein a starting program and a storage device in which data can be written and the like are used at the same time. Because the memory control device according to the present embodiment includes the address line switch 5 and the data line switch 6, the CPU 1 can be started stably and a writing operation and the like of data recorded in the ROM 4 can be performed by using only the ROM 4.

The memory control device according to the present embodiment can be applied to a memory control device that performs various control by the CPU 1. For example, when the memory control device is applied to a railway vehicle, the following effects can be achieved.

Figure 3:
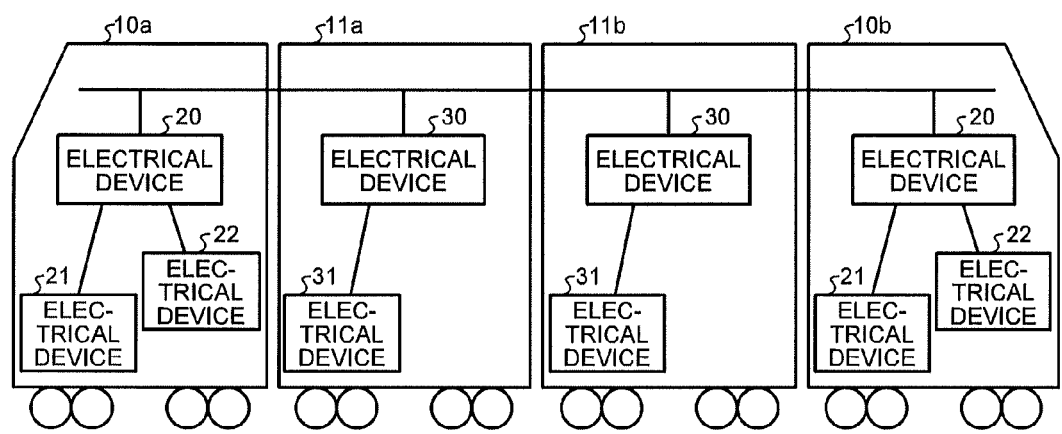
FIG. 3 is an explanatory diagram of effects when the memory control device according to the embodiment of the present invention is incorporated in an in-train device.

FIG. 3 is an explanatory diagram of effects when the memory control device according to the embodiment of the present invention is incorporated in an in-train device. The formation of a train shown in FIG. 3 is constituted by a plurality of vehicles and, as an example, it is constituted by lead vehicles 10a and 10b and vehicles 11a and 11b other than these lead vehicles.

To reduce loads of crews and to improve services for passengers, a train-information management device that controls and monitors an operation status of a service machine and the like is incorporated in recent railway vehicles. As an example, electrical devices 20, 21, and 22 are incorporated in the vehicles 10a and 10b. For example, the electrical device 20 is a central station that constitutes the train-information management device, and the electrical device 22 is, for example, a terminal device constituting the train-information management device. The electrical device 21 is, for example, a monitor display and the like arranged on a cab. These electrical devices are connected to each other by an in-vehicle transmission path so as to transmit vehicle information.

As an example, electrical devices 30 and 31 are incorporated in the vehicles 11a and 11b. For example, the electrical device 30 is the terminal device described above, and the electrical device 31 is an in-vehicle machine connected to a terminal device (for example, an air conditioner, an SIV, and a VVVF). The electrical devices 30 and 31 are connected to each other by an in-vehicle transmission path. The electrical devices 20 and 30 are connected to each other by an inter-vehicle transmission path.

When a defect caused by a bit error in a flash ROM occurs in these electrical devices, there is a possibility that a malfunction of a CPU occurs and this malfunction largely influences on a train operation. For example, when a defect occurs in a part of in-vehicle machines such as an SIV, a crew can use the train-information management device to search for a cause of the defect, to recognize the phenomenon, and to take an emergency procedure. However, when the train-information management device itself fails, it is difficult to recognize the cause of the defect, and thus there is a possibility that the defect largely influences on the train operation.

In this connection, as the memory control device according to the present embodiment is incorporated in each of the electrical devices, malfunctions of a CPU due to a bit error in a ROM can be prevented and thus an influence on a train operation can be considerably reduced.

Furthermore, the memory control device according to the present embodiment can start a CPU stably and can perform writing and the like of data by using a flash ROM without changing a system of bus control supported by a commercially available CPU (or a commercially available IC).

The memory control device according to the present embodiment is only an example of the contents of the present invention. The memory control device can be combined with other well-known techniques, and it is needless to mention that the memory control device can be configured while modifying it without departing from the scope of the present invention, such as omitting a part thereof.

INDUSTRIAL APPLICABILITY

As described above, the present invention is applicable to a memory control device that executes various control by a CPU, and is particularly useful as an invention that can start a CPU stably and perform writing and the like of data by using a flash ROM.

REFERENCE SIGNS LIST

1 CPU
2 address bus
3 data bus
4 flash ROM (memory)
5 address line switch (first switch)
6 data line switch (second switch)
7 decoder
10a, 10b, 11a, 11b train vehicle
20, 21, 22, 30, 31 electrical device

The invention claimed is:
1. A memory control device comprising:
a CPU;
an electrically-rewritable non-volatile memory that records therein first information having undergone an error-correction coding process and second information not having undergone an error-correction coding process;
a first switch device that detects an address output from the CPU, and switches between a first path that connects an address bus to the memory so that the CPU can read first information recorded in the memory and a second path that connects the address bus to the memory so that the second information recorded in the memory can be erased, written, and read;
a decoder that performs error correction on the first information recorded in the memory, removes a redundant bit from corrected information, and decodes information before undergoing an error-correction coding process; and
a second switch device that detects an address output from the CPU, and switches between a third path that connects the decoder to a data bus so that information decoded by the decoder is transmitted to the data bus of the CPU and a fourth path that connects the memory to the data bus so that the second information recorded in the memory can be erased, written, and read, and the first switch device and the second switch device are separate devices.

2. The memory control device according to claim 1, wherein
when an address output from the CPU is a first address indicating that the first information is to be read, the first switch device detects the first address and connects the address bus to the memory by the first path and the second switch device detects the first address and connects the decoder to the data bus by the third path, and
when an address output from the CPU is a second address indicating that the second information is to be erased, written, and read, the first switch device detects the second address and connects the address bus to the memory by the second path and the second switch device detects the second address and connects the decoder to the data bus by the fourth path.

3. The memory control device according to claim 1, wherein
the CPU performs error-correction coding on information requiring error correction by software processing, and information having undergone the error-correction coding process is recorded in the memory as the first information.

4. The memory control device according to claim 1, wherein
the decoder retains error occurrence information when error correction is performed, and the CPU identifies a storage area where an error occurs on the memory based on the error occurrence information, performs an error-correction coding process on information read from the storage area, and overwrites information having undergone the error-correction coding process in the storage area.

5. The memory control device according to claim 1, wherein the first information is data of a starting program of the CPU.

6. A memory control method of an electrically-rewritable non-volatile memory that records therein first information having undergone an error-correction coding process and second information not having undergone an error-correction coding process, the memory control method comprising:
when an address output from a CPU is a first address indicating that the first information is to be read, a step at which a first switch device that switches between a first path that connects an address bus to the memory so that a CPU can read the first information recorded in the memory and a second path that connects the address bus to the memory so that the second information recorded in the memory can be erased, written, and read, detects the first address and connects the address bus to the memory by the first path; and a step at which a second switch device that switches between a third path that connects a decoder that performs error correction on the first information recorded in the memory, removes a redundant bit from corrected information, and decodes information before undergoing an error-correction coding process to a data bus, so that information decoded by the decoder is transmitted to the data bus of the CPU and a fourth path that connects the memory to the data bus so that the second information recorded in the memory can be erased, written, and read, detects the first address and connects the decoder to the data bus by the third path, wherein the first switch device and the second switch device are separate devices.

7. The memory control method according to claim 6, further comprising:

when an address output from the CPU is a second address indicating that the second information is to be erased, written, and read, a step at which the first switch device detects the second address and connects the address bus to the memory by the second path; and a step at which the second switch device detects the second address and connects the decoder to the data bus by the fourth path.

* * * * *